(12) United States Patent
Morris et al.

(10) Patent No.: US 8,607,303 B2
(45) Date of Patent: Dec. 10, 2013

(54) TECHNIQUES FOR MODIFICATION OF ACCESS EXPIRATION CONDITIONS

(75) Inventors: Cameron Craig Morris, Saratoga Springs, UT (US); Lloyd Leon Burch, Payson, UT (US)

(73) Assignee: Apple Inc., Cupertino, CA (US)

( * ) Notice: Subject to any disclaimer, the term of this patent is extended or adjusted under 35 U.S.C. 154(b) by 1494 days.

(21) Appl. No.: 11/590,268

(22) Filed: Oct. 31, 2006

(65) Prior Publication Data

US 2008/0114986 A1    May 15, 2008

(51) Int. Cl.
G06F 17/00     (2006.01)
H04L 29/06     (2006.01)

(52) U.S. Cl.
USPC .................................................. 726/1; 726/6

(58) Field of Classification Search
None
See application file for complete search history.

(56) References Cited

U.S. PATENT DOCUMENTS

| | | | |
|---|---|---|---|
| 6,292,904 B1 | 9/2001 | Broomhall et al. | |
| 6,341,352 B1 | 1/2002 | Child et al. | |
| 6,389,282 B1 | 5/2002 | Hirsch | |
| 6,691,232 B1* | 2/2004 | Wood et al. | 726/6 |
| 6,826,700 B1 | 11/2004 | Germscheid et al. | |
| 7,493,493 B2* | 2/2009 | Dharmarajan | 713/184 |
| 7,904,729 B2* | 3/2011 | Little et al. | 713/183 |
| 2004/0073815 A1* | 4/2004 | Sanai et al. | 713/202 |
| 2004/0177272 A1* | 9/2004 | Walters | 713/201 |
| 2004/0181696 A1 | 9/2004 | Walker | |
| 2005/0015604 A1 | 1/2005 | Sundararajan et al. | |
| 2005/0114673 A1* | 5/2005 | Raikar et al. | 713/182 |
| 2005/0114713 A1* | 5/2005 | Beckman et al. | 713/202 |
| 2007/0006301 A1* | 1/2007 | Nickell et al. | 726/22 |

FOREIGN PATENT DOCUMENTS

WO    WO-2005050417 A    6/2005

OTHER PUBLICATIONS

Kramarz-Von Kohout, English Translation of WO 2005/050417 A1, Jun. 2, 2005, pp. 1-6.*
"European Application No. EP07117899 European Search Report completed Jan. 31, 2008".
Bishop, M, et al., "Improving System Security via Proactive Password Checking", Computers and Security, Elsevier Science Publishers, vol. 14(3), (Jan. 1995), 233-49.

* cited by examiner

Primary Examiner — Nadia Khoshnoodi
(74) Attorney, Agent, or Firm — Novak Druce Connolly Bove + Quigg LLP (57) ABSTRACT

Techniques for modification of access expiration conditions are presented. A principal supplies a password associated with establishing access to a target resource. In response to the password, characteristics of the password are examined and a custom expiration condition is generated for the password in response to the characteristics and policy. When the custom expiration condition is satisfied, the password and access to the target resource become invalid for use. Moreover, the principal may interactively change a complexity level of any proposed password for purposes of attempting to enhance the expiration condition or for purposes of attempting to degrade the expiration condition.

15 Claims, 3 Drawing Sheets

TECHNIQUES FOR MODIFICATION OF ACCESS EXPIRATION CONDITIONS

FIELD

The invention relates generally to security and more particularly to techniques for modification of access expiration conditions.

BACKGROUND

When enterprise and security administrators set the time for which passwords are to remain valid, they typically decide how often it is that they want a user to select a new password to access the enterprise's assets. They must also decide how complex they want the password to be. These two competing configuration parameters are resolved via a compromise with one another.

For example, if the password complexity is too high and the update frequency to change the password too short, the users will have difficulty in remembering and creating passwords. Conversely, if the password complexity is too low and the update frequency too long, then security to the enterprise's assets may be too easily compromised by intruders.

Compounding this is that some users may prefer to have complex passwords with longer expiration times while other users may prefer to have simple passwords with shorter expiration times. Yet, conventional password administration takes a global approach that is focused on the enterprise as a whole or on particular assets of the enterprise without regard to individual preferences of the users. Consequently, there is generally one global standard approach adopted by administrators that attempts to adequately address as many competing interests as possible.

However, such global approaches ignore the usability issues associated with the individual preferences of the users. Thus, what is needed is a mechanism that allows for the custom modification of security access expiration conditions.

SUMMARY

In various embodiments, techniques for modifying access expiration conditions for access secrets are provided. More specifically, and in an embodiment, a method is presented for custom generating an expiration condition, which is to be associated with a principal-supplied password. A password is received from a principal and an expiration condition for the password is calculated in response to characteristics associated with that password. Next, the expiration condition assigned to the password is communicated to the principal.

DETAILED DESCRIPTION

A "resource" includes a user, content, a processing device, a node, a service, an application, a system, a principal, a directory, a data store, groups of users, combinations of these things, etc. A "principal" is a type of resource that engages in a communication session with one or more other resources for purposes of gaining access to those resources and sub resources controlled by those resources. In an embodiment, a "principal" may be viewed as a user or as an automated application or service. The terms "service" and "application" may be used interchangeably herein and refer to a type of software resource that includes instructions, which when executed by a machine performs operations that change the state of the machine and that may produce output to drive the processing of other machines or resources.

A resource is recognized via an "identity." An identity is authenticated via various techniques (e.g., challenge and response interaction, cookies, assertions, etc.) that use various identifying information (e.g., identifiers with passwords (ID-password combinations), biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given communication session, etc.).

An identity for a principal is at least partially resolved via an authentication technique in which the principal supplies or is identified by a single identifier and one or more authentication secrets (e.g., passwords, biometric data, digital signatures, digital certificates, etc.). As used herein "password" may be used interchangeably with the phrase "authentication secret."

An "identifier" may also be viewed as a principal name or principal ID that the principal may assume for any given context. In an embodiment, a principal has a single identifier and multiple authentication secrets that can be used with that single identifier. In another embodiment, the principal has multiple identifiers, and any given identifier can be used with each of the principal's available authentication secrets, or single one of the identifiers is usable with a subset of authentication secrets associated with the principal.

The identity may also be a special type of identity that the resource assumes for a given context. For example, the identity may be a "crafted identity" or a "semantic identity." An example for creating and using crafted identities may be found in U.S. Patent Publication No. 2007/0061263; entitled "Crafted Identities;" filed on Sep. 14, 2005; and the disclosure of which is incorporated by reference herein. An example for creating and using semantic identities may be found in U.S. Patent Publication No. 2006/0074270; entitled "Semantic Identities;" filed on Oct. 28, 2005; and the disclosure of which is incorporated by reference herein.

The principal's identity for any given context is resolved by authentication techniques that engage an identity service or password service. The password service may be subsumed within or be a part of the identity service. Alternatively, the password service may be a stand alone service that does not interact with and is not dependent on the identity service.

An "identity service" refers to a special type of service that is designed to manage and supply authentication services and authentication information for resources. So, an identity service may authenticate a given principal for access to a variety of local and external resources known to that identity service. In addition the identity service itself may be viewed as a type of resource. In this manner, identity services may authenticate and establish trust with one another viewing one another as a specific type of resource. An identity service may also enlist the assistance of other resources or services to perform any given authentication on a principal.

According to an embodiment, some example identity services, which may be modified to achieve the teachings presented herein, are described in "Techniques for Dynamically Establishing and Managing Authentication and Trust Relationships," filed on Jan. 27, 2004, and having the U.S. Pat. No. 7,299,493; "Techniques for Establishing and Managing a Distributed Credential Store," filed on Jan. 29, 2004, and having the U.S. Pat. No. 7,647,256; and "Techniques for Establishing and Managing Trust Relationships," filed on Feb. 3, 2004, and having the U.S. Pat. No. 7,316,027; all of which are commonly assigned to Novell, Inc., of Provo, Utah and the disclosures of which are all incorporated by reference herein.

An identity service may also provide single sign-on services to a resource. That is, a resource may sign-on to an identity service and acquire identities and credentials to access a variety of other services or resources. In some cases, the identity service is modified or enhanced to perform some of the teachings presented herein and below.

An identity or an account that is associated with a principal expires such that access is no longer permissible using a previously set password when an expiration condition is detected. An "expiration condition" refers to a maximum or threshold number of transactions with a given resource, an elapsed period or time or duration of time that passes from the initial establishment of the identity or account, and/or one or more detected events that force the identity or account to become invalid or unusable with the set password. The time duration limitation of an expiration condition may also be referred to as a time-to-live password attribute or a time-to-live password restriction.

Various embodiments of this invention can be implemented in existing network architectures, security systems, data centers, and/or communication devices. For example, in some embodiments, the techniques presented herein are implemented in whole or in part in the Novell® Access Manger® product, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

Figure 1:
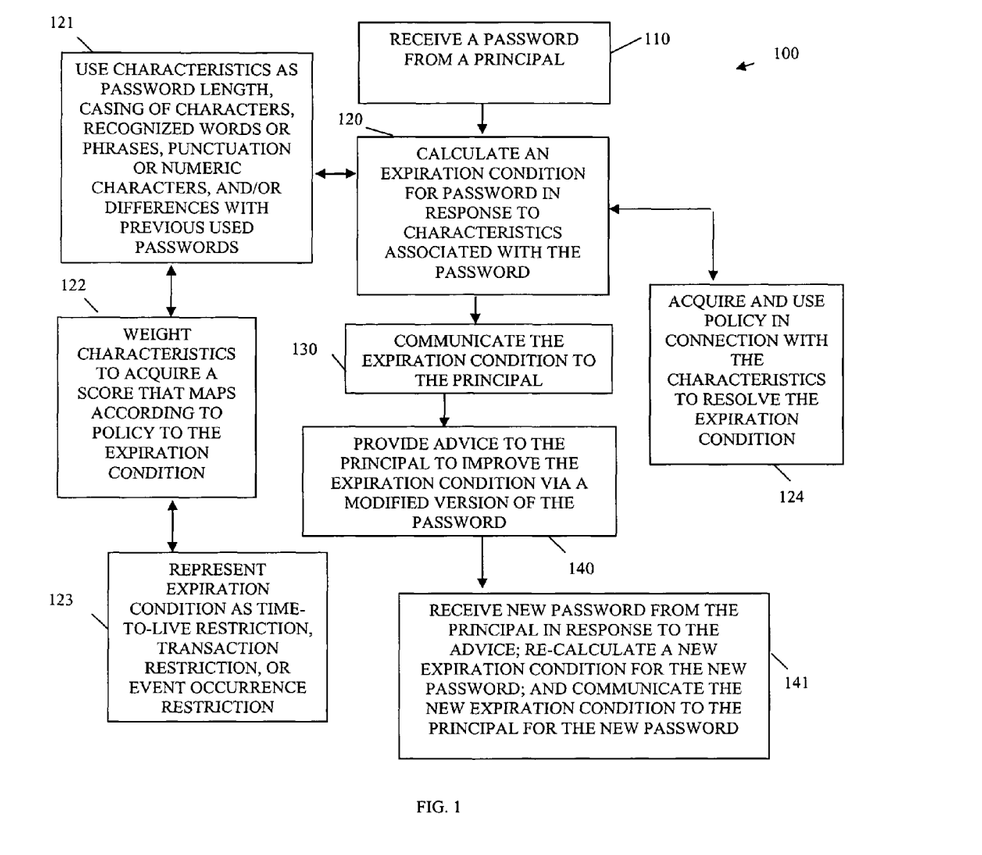
FIG. 1 is a diagram of a method for generating an expiration condition, which is to be associated with a principal-supplied password, according to an example embodiment.

FIG. 1 is a diagram of a method 100 for generating an expiration condition, which is to be associated with a principal-supplied password, according to an example embodiment. The method 100 (hereinafter "password expiration assignment service") is implemented as instructions in a machine-accessible and readable medium. The instructions when executed by a machine perform the processing depicted in FIG. 1. The password expiration assignment service is also operational over and processes within a network. The network may be wired, wireless, or a combination of wired and wireless.

Initially, at 110, the password expiration assignment service receives a proposed password from a principal. The principal desires to set up an account or a temporary identity that permits the principal to access a target resource. The password expiration assignment service manages creating or facilitating the initial account or identity setup. Correspondingly, this may entail that the principal authenticate to the password expiration assignment service using its true identity. Once authenticated policy drives whether or not the principal is permissibly allowed to create a temporary identity or account to access a target resource. Assuming this to be the case, the principal supplies to the password expiration assignment service a proposed or initial password for use with the new identity or new account being created on behalf of the principal to access a target resource.

At 120, the password expiration assignment service identifies a number of characteristics with the proposed password submitted by the principal. The characteristics are used to calculate an expiration condition for the password supplied by the principal. The calculated expiration condition is dependent upon the password characteristics of the password supplied by the principal. The password characteristics can be evaluated and calculated in a variety of manners to resolve a specific expiration condition.

For example, at 121, the password characteristics can include a variety of information that the password expiration assignment service can glean from the principal supplied password. Some characteristics can include, by way of example only and not by way of limitation, the length of the password string supplied by the principal, any upper cased characters identified in the password string, any lower cased characters identified in the password string, any punctuation characters identified in the password string, any numeric or symbol characters identified in the password string, any substrings that are recognized as dictionary words or phrases, any substrings that are recognized as derivatives of prior passwords used by the principal, any substrings that are recognized as derivatives or prior passwords used by other principals, etc.

Each identified characteristic, at 122, may then receive a numeric weight, which is then used to acquire or generate a score for the principal supplied password. That score can map, according to policy, to a specific expiration condition. Again, at 123, the expiration condition may be represented as a time-to-live restriction (temporal limitation), a transactional restriction (usage limitation), or an event occurrence restriction (processing environment limitation). Each characteristic type identified in the password may be associated with a particular weight depending upon how many times it is detected within the password. The sum of the weights can then be added together to acquire a score. The score may map via policy to a specific expiration condition or to a specific range of values associated with a specific expiration condition.

According to an embodiment, at 124, the password expiration assignment service may acquire and use policy in connection with the characteristics to resolve the expiration condition. This can be achieved via a mapping or computation or a combination of a calculation and a mapping, as was presented above. It may also be the case that the characteristics that the password expiration assignment service looks for within the principal-supplied password are themselves defined within the policy.

At 130 and once the expiration condition is resolved, the password expiration assignment service communicates the resolved or calculated expiration condition to the principal for the principal-supplied password. At this point the principal can accept the expiration condition or may engage in additional interaction with the password expiration assignment service to modify the password for purposes of improving or degrading the expiration condition.

So, at 140, the password expiration assignment service may provide advice to the principal that can be used to improve the expiration condition via a modified version of the password. The advice may be in the form of instruction, such as "punctuation characters can improve your password strength and thus your expiration condition." The advice may also provide hints or suggestions as to how the expiration condition can be degraded, such as "all lower case characters and nothing more provide weak password strength and thus degrade your expiration condition."

The principal may not always want to improve the expiration condition. That is, some principals may want a simple to remember password even if such a password has a limited life cycle; whereas other principals may want a complex password, which is difficult to remember, so that the password has longevity. This is a choice that the principal can make and can customize with the teachings presented herein. The principal may decide that the expiration condition should be strong or should be weak and this decision is made via the type of password supplied by the principal and via suggestions and advice offered via interactions with the password expiration assignment service. Such user or principal control and customization are not presently available in the industry.

In response to the password expiration assignment service advice or suggestions, at 141, the password expiration assignment service may receive a new password from the principal. That new password is evaluated for new characteristics and a new expiration condition is calculated, which is then communicated to the principal. These processing interactions may iterate any number of times until the principal is satisfied with the acquired expiration condition and password complexity associated with the principal-supplied password.

Once accepted by the principal, the password expiration assignment service establishes a temporary identity or account for the principal to use in connection with the password for purposes of accessing a target resource. However, when the expiration condition is satisfied the account, identity and password are no longer valid and cannot be used to access the target resource.

Figure 2:
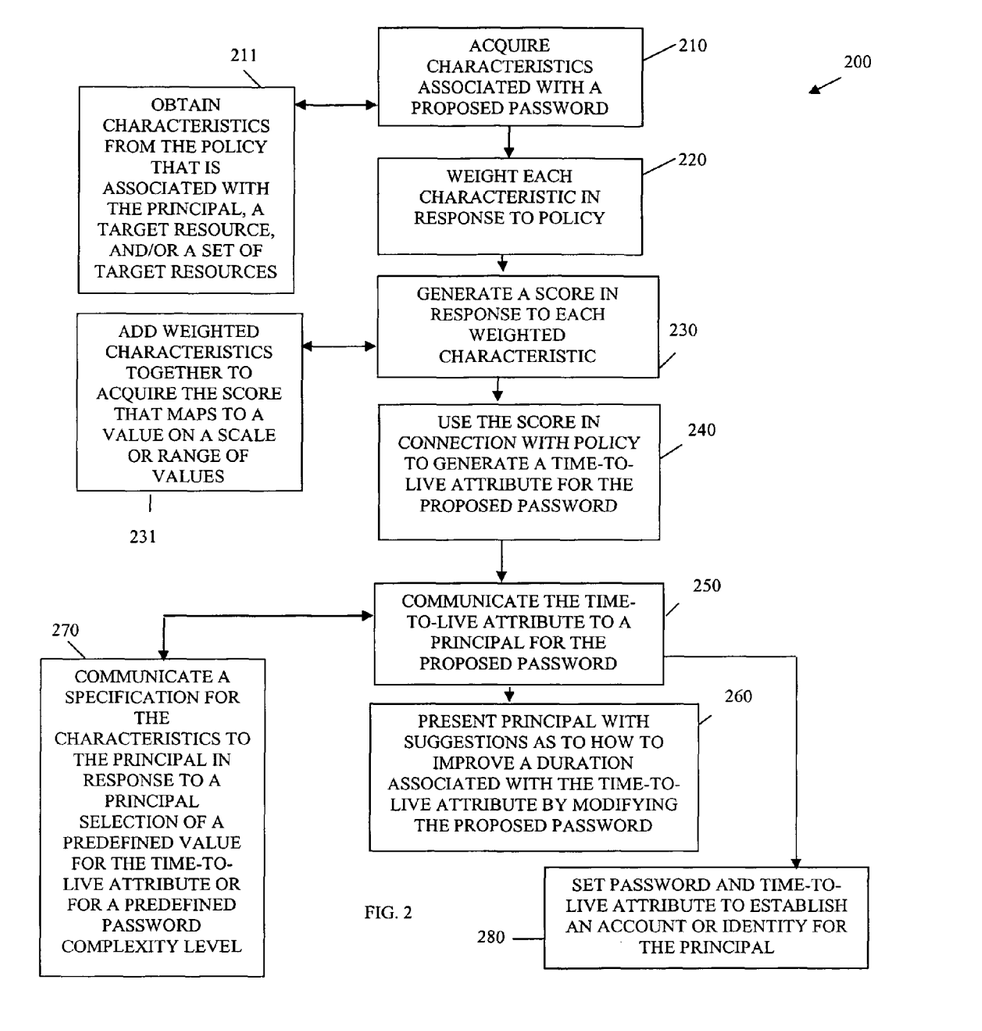
FIG. 2 is a diagram of a method for generating a time-to-live attribute for a principal-supplied password, according to an example embodiment.

FIG. 2 is a diagram of a method 200 for generating a time-to-live attribute for a principal-supplied password, according to an example embodiment. The method 200 (hereinafter "time-to-live service" is implemented in a machine-accessible and readable medium as instructions. The instructions when executed by a machine perform the processing depicted in the FIG. 2. Moreover, the time-to-live service is operational over a network, and the network may be wired, wireless, or a combination of wired and wireless. The processing associated with the time-to-live service presents an alternative perspective to the processing associated with the password expiration assignment service described above with the method 100 and within the context of the FIG. 1.

At 210, the time-to-live service acquires characteristics associated with a principal proposed password. The principal is proposing the password to establish an account or temporary identity for purposes of accessing a target resource or a set of target resources. Accordingly, it is assumed that the principal is already authenticated to the time-to-live service and policy permits the principal to create the account or temporary identity being requested via the proposed password.

According to an embodiment, at 211, the time-to-live service may obtain the characteristics from a policy that is associated with the principal, the target resource, a set of target resources, or combinations of some or all of these entities. Once the identity of the proper policy is known and acquired, that policy may identify the types of characteristics that the time-to-live service should look for and evaluate from the principal-supplied password.

At 220, the time-to-live service weights each characteristic type detected in the principal-supplied password in response to policy that defines the same. At 230, a score is then generated in response to each weighted characteristic. One technique for doing this is depicted at 231, where each weighted characteristic is added together after being weighted to acquire the score. The score may then map to a predefined scale or to a range of values within a scale, and the policy may associate a value from the scale or range of values to a specific time-to-live attribute that is to be associated with the principal-supplied password.

At 240, the time-to-live service uses the score in connection with the policy to generate or finally resolve a specific time-to-live attribute for the proposed password supplied by the principal. This time-to-live attribute is a limitation or restriction imposed on the proposed password and the account or temporary identity being established by the time-to-live service. It is customized based on the password characteristics of the principal-supplied password and based on policy evaluation. The limitation is a temporal limitation that represents a duration or a date and time specific point in time for which the password becomes invalid for use with the temporary identity or account. This temporal limitation may begin, assuming it is a duration, when the temporary identity is created or when the principal makes a first access against the target resource. In fact, any temporal limitation may be represented with the time-to-live attribute on the proposed password.

Moreover, whether the principal realizes it or not the actual value calculated or resolved via policy for the time-to-live attribute was directly dependent upon and related to the password characteristics supplied by the proposed password of the principal. Thus, the principal has some custom control over the actual value assigned to the time-to-live attribute. A more complex password format with more diverse and complex password characteristics will likely yield the principal a longer time-to-live attribute value and conversely a less complex password format with fewer and less complex password characteristics will likely yield the principal a shorter time-to-live attribute value.

At 250, the time-to-live service communicates the time-to-live attribute to the principal for the proposed password. At this point the principal may accept the proposed password that the principal submitted and the calculated time-to-live attribute value or the principal may engage in interactive communication with the time-to-live service for purposes of achieving a better or even worse time-to-live attribute value. This necessarily entail that the principal supply modified passwords as alternatives to what was originally supplied with the proper complexity level or characteristics to achieve the desired value for the time-to-live attribute.

Thus, in one case, at 260, the time-to-live service may present the principal with suggestions as to how to improve or even degrade a duration associated with the time-to-live attribute. The suggestions imply or direct that the principal provide a modified version of the original supplied password. A more complex (specific characteristics and perhaps in specific combinations with one another) password modification yields a longer duration for the time-to-live attribute whereas a less complex (specific characteristics or lack thereof and lack of combinations with one another) yields a shorter duration for the time-to-live attribute.

In an embodiment, at 270, the time-to-live service may even communicate a specification for the characteristics to the principal. The specification provides an indication to the principal as to who the duration for the time-to-live attribute is being calculated. This specification may be communicated from the time-to-live service to the principal in response to the principal identifying a specific desired duration for the time-to-live attribute or in response to the principal identifying a specific desired password complexity level. Thus, the principal may achieve the proper balance that the principal desires via customization to the time-to-live attribute duration and/or via a selection of a specific password complexity level. The time-to-live service supplies information based on these selections to the principal so that the principal can supply a proper modified version of the password that will produce the desired results of the principal. In this manner, policy and custom interactions of the desires of the principal drive the password complexity and the duration for the time-to-live attribute for any given principal supplied password.

Once the principal has the desired password, with the desired password complexity, and the desired assigned time-to-live attribute duration, at 280, the principal accepts and the time-to-live service sets the password agreed upon and the time-to-live attribute to establish an account or temporary identity that the principal can use to access a target resource or set of target resources. Subsequent to this, the principal authenticates to the target resource(s) using the account or temporary identity and the password and performs operations defined according to assigned access rights. When the time-to-live attribute is satisfied, the account, password, and temporary identity can not longer be used to authenticate to the target resource(s) and gain access. At this point the principal would have to establish a new password and time-to-live attribute (assuming policy permits renewal of the account or temporary identity).

Figure 3:
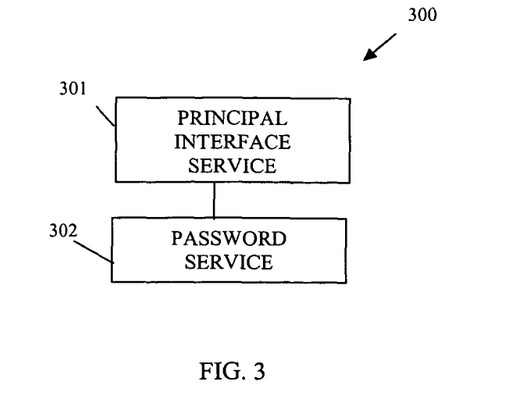
FIG. 3 is a diagram of an interactive password establishment system, according to an example embodiment.

FIG. 3 is a diagram of an interactive password establishment system 300, according to an example embodiment. The interactive password establishment system 300 is implemented as instructions on or within a machine-accessible and readable medium. The instructions when executed by a machine perform processing depicted with respect to the methods 100 and 200 of the FIGS. 1 and 2, respectively. The interactive password establishment system 300 is also operational over a network and the network may be wired, wireless, or a combination of wired and wireless.

The interactive password establishment system 300 includes a principal interface service 301 and password service 302. Each of these and their interactions with one another will now be discussed in turn.

The principal interface service 301 is what a principal uses to interact with the password service. This may be any application programming interface (API), such as but not limited to, World-Wide Web (WWW) pages, custom application screens or forms, automated API calls used by automated principals, and the like. The principal interface service 301 may also recognize when a previously used password of a principal is expired and may automatically present itself to the principal when the principal attempts to authenticate to a target resource using the expired password so that the principal can re-establish or renew authentication to the target resource via a new password. The principal supplies proposed passwords via the principal interface service 301 and the backend of the principal interface service 301 interacts with the password service 302.

The password service 302 is designed to custom generate time-to-live attribute values for principal-supplied passwords acquired via the principal interface service 301. Example processing associated with the password service 302 was provided in detail above with respect to the methods 100 and 200 of the FIGS. 1 and 2, respectively.

Essentially, to custom generate the time-to-live attribute values the password service 302 recognizes or parses predefined password characteristics from a principal-supplied password. These characteristics are then computed using a calculation and/or mapping algorithm to produce a specific time-to-live attribute value. The calculation and mapping and even the characteristic types maybe defined within policy. The principal-supplied password becomes invalid when the time-to-live attribute value expires.

According to an embodiment, the password service 302 generates a score for extracted password characteristics identified in the principal-supplied password. The score is then mapped to a specific time-to-live attribute value according to the dictates of a policy. A higher score than what is considered to be average along a predefined scale indicates the principal-supplied password has a higher than average password complexity level and is therefore assigned a higher than average value for the time-to-live attribute. Similarly, a lower score than what is considered to be average along the predefined scale indicates the principal-supplied password has a lower than average password complexity level and is thus assigned a lower than average value for the time-to-live attribute.

In an embodiment, the principal interface service 301 may also interact with the password service 302 to permit the principal to alter the time-to-live attribute to a desired value. In such a case, the password service 302 communicates back to the principal via the principal interface service suggestions or advice on how the principal can modify the original supplied password to achieve a desired complexity level that is needed to provide the principal the desired value for the time-to-live attribute.

In a similar manner, the principal interface service 301 may also interact with the password service 302 to permit the principal to modify the password and in response to this a new value for the time-to-live attribute is generated that corresponds to the new password complexity level for the new recognized password characteristics that the password service 302 derives from the new or modified password.

Figure 4:
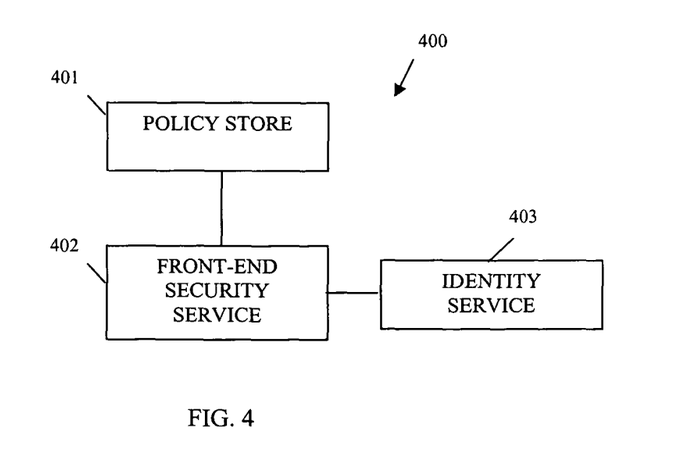
FIG. 4 is a diagram of a custom time-to-live password assignment system, according to an example embodiment.

FIG. 4 is a diagram of a custom time-to-live password assignment system 400, according to an example embodiment. The custom time-to-live password assignment system 400 is implemented as instructions on or within a machine-accessible and readable medium. The instructions when executed by a machine also perform, among other things; the processing depicted with respect to the methods 100 and 200 of the FIGS. 1 and 2, respectively. The custom time-to-live password assignment system 400 is also operational over a network and the network may be wired, wireless, or a combination of wired and wireless. The custom time-to-live password assignment system 400 presents a different perspective and architecture to what was presented with the interactive password establishment system 300 described above with reference to the FIG. 3.

The custom time-to-live password assignment system 400 includes a policy store 401 and a front-end security service 402. In some cases, the custom time-to-live password assignment system 400 may also include an identity service 403. Each of these and their interactions with one another will now be discussed in turn.

The policy store 401 houses policies for password complexity levels, time-to-live attributes, and access rights for target resources or sets of target resources. Any particular policy may be acquired via an identity or identifier associated with a particular principal, a particular target resource, a particular password complexity level, or combinations of these things. The policies include instructions or dictates that the front-end security service 402 enforces when establishing or facilitating the establishment of accounts or temporary identities that are used to access the target resource(s). Each account is accessed via a password. The password complexity levels are also defined in the policies and map to specific time-to-live attribute values.

The front-end security service 402 acts as a security mechanism for the target resource(s) and interacts with principals to establish access accounts. The principals supply passwords and the front-end security service 402 uses policies acquired from the policy store 401 to custom generate or custom assign specific time-to-live attribute values for specific passwords supplied by the principals. When the time-to-live attribute values expire the passwords are no longer usable to access the target resource(s).

The front-end security service 402 derives a complexity level for any given password by evaluating characteristics of that password. Example characteristics and techniques for deriving a score and thus a complexity level were discussed in detail above with reference to the methods 100 and 200 of the FIGS. 1 and 2, respectively. Policy maps the complexity level or score associated with the evaluated characteristics to a specific time-to-live attribute value.

The front-end security service 402 may also permit the principal to alter the password to achieve a different complexity level, which in turn results in a modified time-to-live attribute value for the modified or altered password. It may even be the case that the principal selects a desired value for the time-to-live attribute and the front-end security service 402 informs the principal as to a specific password complexity level needed for that desired value of the time-to-live attribute. This interaction between the front-end security service 402 and the principal permits customization of the time-to-live attribute and the password complexity level in a manner that conforms to enterprise policy and accounts for user desires or preferences.

In some embodiments, the custom time-to-live password assignment system 400 may also include an identity service 403. The identity service 403 may manage authentication and access to the target resource(s). So, the front-end security service 402 interacts with the identity service 403 to establish the accounts and passwords for the principals along with the custom-generated time-to-live attribute values. So, in such an arrangement if a password expires, the identity service 403 may redirect the principal to the front-end security service 402 to re-establish a new account and new password.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method comprising:
receiving, by a computer processor, from a user, a first proposed password and a desired password duration indicating a length of time the user would like the first proposed password to be valid prior to expiration;
determining, by the computer processor, a first complexity level of the first proposed password based on at least one characteristic of the first proposed password;
identifying, by the computer processor, a first password duration of the first proposed password based on the initial complexity level of the first proposed password, wherein the first password duration is a length of time the first proposed password is valid prior to expiration;
identifying, by the computer processor, a desired complexity level based on the desired password duration, wherein the desired complexity level defines at least one password characteristic required to achieve the desired password duration;
determining, by the computer processor, at least one modification to a characteristic of the first proposed password that would increase the initial complexity level of the first proposed password to the desired complexity level; and
suggesting the at least one modification to the user.

2. The method of claim 1, wherein the at least one characteristic is at least one of:
a password length, upper and lower casing of characters used, recognized words or phrases, punctuation characters used, numeric characters used, or difference between previous passwords used by the user.

3. The method of claim 2, wherein determining the first complexity level includes weighting the at least one characteristic to acquire a first score.

4. The method of claim 3, wherein identifying the first password duration includes comparing the first score to a scoring map that identifies an associated complexity level for a score.

5. The method of claim 1, further comprising:
receiving, from the user, a second proposed password in response to the at least one modification suggested to the user.

6. A system comprising:
a computer processor; and
a memory containing instructions that, when executed, cause the processor to:
receive, from a user, a first proposed password and a desired password duration indicating a length of time the user would like the first proposed password to be valid prior to expiration;
determine a first complexity level of the first proposed password based on at least one characteristic of the first proposed password;
identify a first password duration of the first proposed password based on the initial complexity level of the first proposed password, wherein the first password duration is a length of time the first proposed password is valid prior to expiration;
identify a desired complexity level based on the desired password duration, wherein the desired complexity level defines at least one password characteristic required to achieve the desired password duration;
determine at least one modification to a characteristic of the first proposed password that would increase the initial complexity level of the first proposed password to the desired complexity level; and
suggest the at least one modification to the user.

7. The system of claims 6, wherein the at least one characteristic is at least one of:
a password length, upper and lower casing of characters used, recognized words or phrases, punctuation characters used, numeric characters used, or difference between previous passwords used by the user.

8. The system of claim 7, wherein determining the first complexity level includes weighting the at least one characteristic to acquire a first score.

9. The system of claim 8, wherein identifying the first password duration includes comparing the first score to a scoring map that identifies an associated complexity level for a score.

10. The method of claim 6, wherein the instructions further cause the processor to:
receive, from the user, a second proposed password in response to the at least one modification suggested to the user.

11. A non-transitory computer-readable medium containing instructions that, when executed by a computing device, cause the computing device to:
receive from a user, a first proposed password and a desired password duration indicating a length of time the user would like the first proposed password to be valid prior to expiration;
determine a first complexity level of the first proposed password based on at least one characteristic of the first proposed password;
identify a first password duration of the first proposed password based on the initial complexity level of the first proposed password, wherein the first password duration is a length of time the first proposed password is valid prior to expiration;
identify a desired complexity level based on the desired password duration, wherein the desired complexity level defines at least one password characteristic required to achieve the desired password duration;
determine at least one modification to a characteristic of the first proposed password that would increase the initial complexity level of the first proposed password to the desired complexity level; and
suggest the at least one modification to the user.

12. The non-transitory computer-readable medium of claims 11, wherein the at least one characteristic is at least one of:
a password length, upper and lower casing of characters used, recognized words or phrases, punctuation characters used, numeric characters used, or difference between previous passwords used by the user.

13. The non-transitory computer-readable medium of claim 12, wherein determining the first complexity level includes weighting the at least one characteristic to acquire a first score.

14. The non-transitory computer-readable medium of claim 13, wherein identifying the first password duration includes comparing the first score to a scoring map that identifies an associated complexity level for a score.

15. The non-transitory computer-readable medium of claim 11, wherein the instructions further cause the computing device to:
receive, from the user, a second proposed password in response to the at least one modification suggested to the user.

* * * * *

UNITED STATES PATENT AND TRADEMARK OFFICE
CERTIFICATE OF CORRECTION

| | | |
|---|---|---|
| PATENT NO. | : 8,607,303 B2 | Page 1 of 1 |
| APPLICATION NO. | : 11/590268 | |
| DATED | : December 10, 2013 | |
| INVENTOR(S) | : Cameron Craig Morris et al. | |

It is certified that error appears in the above-identified patent and that said Letters Patent is hereby corrected as shown below:

In the claims:

Column 10, claim 1, line 8, please change "initial" to --first--;

Column 10, claim 1, line 18, please change "initial" to --first--;

Column 10, claim 6, line 51, please change "initial" to --first--;

Column 10, claim 6, line 61, please change "initial" to --first--;

Column 11, claim 11, line 26, please change "initial" to --first--;

Column 12, claim 11, lines 4-5, please change "ini-tial" to --first--.

Signed and Sealed this
Seventh Day of April, 2015

Michelle K. Lee
*Director of the United States Patent and Trademark Office*